(12) United States Patent
Tran et al.

(10) Patent No.: US 12,417,543 B2
(45) Date of Patent: Sep. 16, 2025

(54) ORGAN SEGMENTATION IN IMAGE

(71) Applicant: Raytheon Company, Arlington, VA (US)

(72) Inventors: Tuan T. Tran, Plano, TX (US); Raymond Samaniego, Prosper, TX (US)

(73) Assignee: Raytheon Company, Arlington, VA (US)

( * ) Notice: Subject to any disclaimer, the term of this patent is extended or adjusted under 35 U.S.C. 154(b) by 400 days.

(21) Appl. No.: 17/833,403

(22) Filed: Jun. 6, 2022

(65) Prior Publication Data
US 2022/0392077 A1 Dec. 8, 2022

Related U.S. Application Data

(60) Provisional application No. 63/197,877, filed on Jun. 7, 2021.

(51) Int. Cl.
*G06T 7/136* (2017.01)
*G06T 3/40* (2024.01)
(Continued)

(52) U.S. Cl.
CPC ............... *G06T 7/136* (2017.01); *G06T 3/40* (2013.01); *G06T 7/11* (2017.01); *G06T 7/174* (2017.01);
(Continued)

(58) Field of Classification Search
CPC ... G06T 7/136; G06T 3/40; G06T 7/11; G06T 7/174; G06T 2207/10081;
(Continued)

(56) References Cited

U.S. PATENT DOCUMENTS 10,181,191 B2 1/2019 Wang et al.
2005/0276455 A1* 12/2005 Fidrich .................... G06T 7/66
382/128

(Continued)

FOREIGN PATENT DOCUMENTS

CN 111481224 8/2020
EP 4352689 A1 4/2024
(Continued)

OTHER PUBLICATIONS

Cai, Jinzheng, et al., "Pancreas Segmentation in CT and MRI Images via Domain Specific Network Designing and Recurrent Neural Contextual Learning", (Mar. 30, 2018), 11 pgs.
(Continued)

*Primary Examiner* — Oneal R Mistry
*Assistant Examiner* — Jongbong Nah
(74) *Attorney, Agent, or Firm* — Schwegman Lundberg & Woessner, P.A.

(57) ABSTRACT

Discussed herein are devices, systems, and methods for organ mask generation. A device, system and method for organ mask generation including generating a synthetic centroid mask, identifying first and second intensity thresholds, in a first segmentation pass, setting (i) pixels of an image with intensities less than the first threshold to zero and
(Continued)

(ii) pixels of the image corresponding to objects with centroids outside the synthetic centroid mask to zero, resulting an initial organ mask, in a second segmentation pass, setting pixels (i) with intensities less than the second threshold, the second threshold less than the first threshold to zero and (ii) setting pixels corresponding to objects with centroids outside the initial organ mask to zero, resulting in a second organ mask, and expanding and filling the second organ mask to generate an organ mask.

18 Claims, 12 Drawing Sheets

(51) Int. Cl.
  *G06T 7/11* (2017.01)
  *G06T 7/174* (2017.01)
(52) U.S. Cl.
  CPC .............. *G06T 2207/10081* (2013.01); *G06T 2207/10088* (2013.01); *G06T 2207/20021* (2013.01); *G06T 2207/20212* (2013.01)
(58) Field of Classification Search
  CPC . G06T 2207/10088; G06T 2207/20021; G06T 2207/20212; G06T 2207/10121; G06T 2207/20036; G06T 2207/20104; G06T 2207/20132; G06T 2207/30004
  See application file for complete search history.

(56) References Cited

U.S. PATENT DOCUMENTS

| | | | | |
|---|---|---|---|---|
| 2016/0300343 A1* | 10/2016 | Gazit | .................... | G06T 7/0014 |
| 2016/0300351 A1* | 10/2016 | Gazit | ........................ | G06T 5/70 |
| 2017/0249744 A1* | 8/2017 | Wang | ........................ | G06T 1/60 |
| 2019/0164291 A1* | 5/2019 | Wang | ..................... | G06V 10/50 |
| 2019/0205606 A1* | 7/2019 | Zhou | .................... | G06F 18/285 |
| 2021/0142471 A1* | 5/2021 | Tran | .......................... | G06T 5/50 |
| 2022/0319008 A1* | 10/2022 | Bengtsson | ................. | G06T 7/11 |
| 2023/0281809 A1* | 9/2023 | Song | ...................... | G06N 3/084 |
| | | | | 382/131 |

FOREIGN PATENT DOCUMENTS

| | | |
|---|---|---|
| JP | 2008043565 | 2/2008 |
| JP | 2009219610 | 10/2009 |
| JP | 2017148283 | 8/2017 |
| WO | 2022261006 | 12/2022 |

OTHER PUBLICATIONS

Cai, Jinzheng, et al., "Pancreas Segmentation in MRI Using Graph-Based DecisionFusion on Convolutional Neural Networks", Lecture Notes in Computer Science 9901, (2016), 442-450.

Zhu, Zhuotun, et al., "Multi-Scale Coarse-to-Fine Segmentation for Screening Pancreatic Ductal Adenocarcinoma", International Conference on Medical Image Computing and Computer-Assisted Intervention, (Oct. 10, 2019), 9 pgs.

"International Application Serial No. PCT US2022 032360, International Search Report mailed Oct. 11, 2022", 5 pgs.

"International Application Serial No. PCT US2022 032360, Written Opinion mailed Oct. 11, 2022", 8 pgs.

Cai, Jinzheng, "Pancreas Segmentation in CT and MRI Images via Domain Specific Network Designing and Recurrent Neural Contextual Learning", (Mar. 30, 2018), 11 pgs.

Cai, Jinzheng, "Pancreas Segmentation in MRI Using Graph-Based Decision Fusion on Convolutional Neural Networks", Lecture Notes in Computer Science 9901, (2016), 442-450.

Wen, Quan, "A novel fusion approach for segmenting dermoscopy image based on region consistency", 2013 International Conference On Computational Problem-Solving (ICCP), IEEE,, (2013), 267-270.

Zhu, Zhuotun, "Multi-Scale Coarse-to-Fine Segmentation for Screening Pancreatic Ductal Adenocarcinoma", International Conference on Medical Image Computing and Computer-Assisted Intervention, (Oct. 10, 2019), 9 pgs.

"International Application Serial No. PCT/US2022/032360, International Preliminary Report on Patentability mailed Dec. 21, 2023", 10 pgs.

"Japanese Application Serial No. 2023-575366, Notification of Reasons for Refusal mailed Jan. 7, 2025", With English Machine Translation, 9 pgs.

"Canadian Application Serial No. 3,221,940, Examiners Rule 86(2) Report mailed Feb. 12, 2025", 5 pgs.

"Japanese Application Serial No. 2023-575366, Response filed Mar. 27, 2025 to Notification of Reasons for Refusal mailed Jan. 7, 2025", W English Claims, 12 pgs.

* cited by examiner

ORGAN SEGMENTATION IN IMAGE

CLAIM OF PRIORITY

This patent application claims the benefit of U.S. Provisional Patent Application No. 63/197,877, filed Jun. 7, 2021, which is incorporated by reference herein in its entirety.

TECHNICAL FIELD

Embodiments discussed herein regard devices, systems, methods, and machine-readable media for medical imaging and isolating organs in a medical image.

BACKGROUND

Medical imaging scans, such as magnetic resonance imaging (MRI) scans and computerized axial tomography (CT or CAT) scans are procedures that may be used to obtain information about the internal structure of an object, such as a patient. Medical imaging scans may be used to detect indications of cancer. Cancer in some organs, such as the pancreas, may be difficult to detect with a medical imaging scan because of the position of the organ within the body and the homogeneity of the surrounding tissue.

Finding an organ, such as the pancreas, in a medical imaging scan may be part of the process for assessing its health. The process of finding the organ may be time-consuming for a person, such as a radiologist, viewing the scan, and it may be difficult for the radiologist to reliably find the boundaries of the organ. Thus, there is need for a system and method for isolating organs in medical imaging scans.

DETAILED DESCRIPTION

Figure 1:
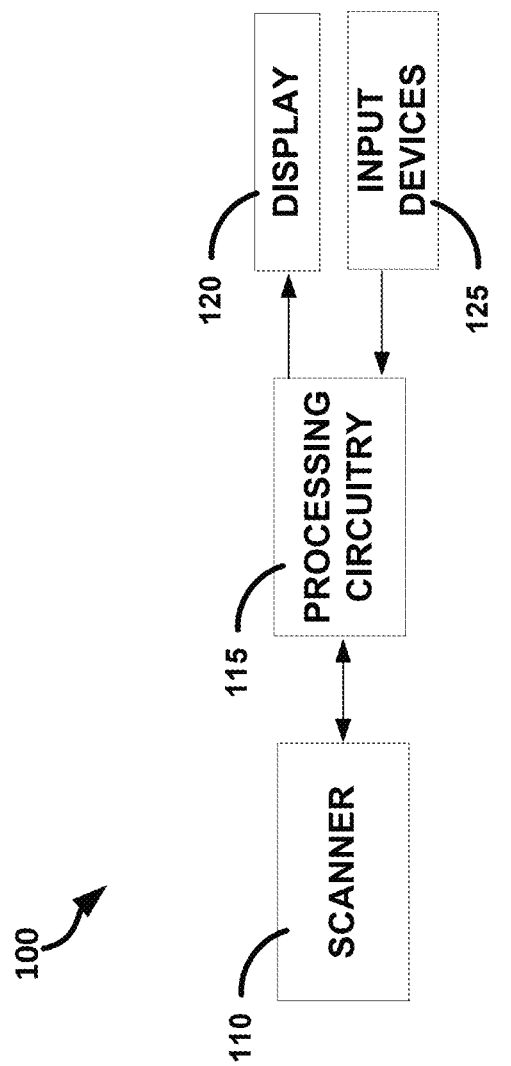
FIG. 1 shows a block diagram of a system for performing a scan and processing and displaying the results, according to one or more embodiments.

A CAT scan is a procedure in which an object (e.g., a patient) is illuminated from several directions with penetrating (e.g., Xray) radiation from a radiation source, and a scan image of the transmitted radiation is formed, in each instance, by a detector, to form a plurality of scan images, each of which may be represented as a two-dimensional array. The radiation may be attenuated at different rates in different kinds of matter; accordingly, each point in each image may correspond to a transmitted radiant intensity depending on the attenuation rates of the compositions of matter on the path along which the radiation traveled from the radiation source to the detector. From the combination of scan images, raw scan data, (e.g., a three-dimensional model of the "density" of the object) may be formed. As used herein, the "density" within an object is any characteristic that varies within the object and that is measured by the medical imaging scan. For example, with respect to CAT scans, the "density" may refer to the local rate of attenuation of the penetrating radiation and with respect to MRI scans, the "density" may refer to the density of atoms having a nuclear resonance at the frequency of the probe radio frequency (RF) signal, in the presence of the magnetic field being applied.

Although some examples are discussed in the present disclosure in the context of CAT scans or MRI scans of a human patient, the invention is not limited thereto, and in some embodiments other kinds of scans providing three-dimensional density data such as positron emission tomography scans, or scans of objects other than human patients may be processed in an analogous fashion. In the case of other kinds of scans, density may be defined accordingly; in the case of a positron emission tomography scan, for example, the density may be the density of nuclei that decay by beta plus emission. As used herein, the term "object" includes anything that may be scanned, and encompasses without limitation human patients, animals, plants, inanimate objects, and combinations thereof.

When the object being imaged is a human patient (or other living entity), a contrast agent may be used (e.g., injected into or ingested by the patient) to selectively alter the density of some tissues. The contrast agent may for example include a relatively opaque substance (i.e., relatively opaque to the penetrating radiation). The density of tissue containing the contrast agent may be increased as a result, and it may be increased to an extent that depends on the concentration of contrast agent in the tissue.

Prior segmentation approaches are done with machine learning (ML) techniques, such as convolution neural network (CNNs) or some types of label fusion. These segmentation schemes are successful with larger organ segmentation (e.g., liver or kidney), but low success with smaller organ segmentation due, at least in part, to a small size, variation in shape, intensity, and data statistics in the smaller organ. Unlike the larger organs, the smaller organs, like the pancreas, are more easily deformable. This is, at least in part, because the soft tissue that form the pancreas can be pushed to conform to surrounding surfaces. This deforming causes the boundaries (often) to be blurry and blended into other neighboring organs. Further, a smaller organ like the pancreas can appear in a limited number of scans/slices. In the scans/slices in which the pancreas appears, the pancreas can be overlaid by other organs. This overlay of other organs often causes only a portion of the smaller organ to be shown in a given scan/slice.

Embodiments regard segmentation that is not ML based, but rather is heuristic based. Embodiments can use multiple scan passes/thresholds in segmenting a small organ from an image. Embodiments can use a 3D correlation with synthetic centroid to help partition or regroup groups of pixels.

Embodiments can include frame normalization that excludes external body part(s) from the scans/slices. The terms frame, scan, slice, image are all used interchangeably herein. Embodiments can use a synthetic centroid mask that includes a centroid about a synthetic mask and not a single centroid point. Embodiments can include an iterative approach to finding thresholds per scan/slice that account for variations in MRI intensity. Embodiments can include another normalization operation that normalizes pixels of a frame relative to a frame position and image size. Embodiments can use centroid masks to retain or remove one or more objects in a frame. Embodiments can include a boundary test to help distinguish between the small organ and other parts in the frame. Embodiments can include identification of a "center slice", such as by correlating detection slices to find a center reference frame. Embodiments can include removing high mean objects, such as to remove a vein, bone, or other high intensity object in the frame. Embodiments can include disconnecting edges to disconnect a boundary to a neighbor organ or other object. Embodiments can include filling and connecting organ mask parts, such as to reconnect broken organ parts (from three-dimensional (3D) correlation).

FIG. 1 shows a block diagram of a system 100 for performing a scan and processing and displaying the results, according to one or more embodiments. The system 100 includes a scanner 110, processing circuitry 115, a display 120 for displaying images, or sequences of images in the form of a movie (or "video"), and one or more input devices 125 such as a keyboard or mouse, that an operator (e.g., a radiologist) may use to operate the system 100. The input device 125 can be used by the operator to affect the processing of the images to be displayed. The processing circuitry 115, the display 120, and the input devices 125 may be part of a unitary system or may be a distributed system with the processing circuitry 115, for example, being separate and communicatively coupled to the display 120 and input devices 125. In some embodiments, servers store the images and clients call the images, with image processing performed on the server or on the client, or both.

The scanner 110 can generate scans of an interior portion of an entity. The scans of the entity can be provided and analyzed together as a group of scans. For example, a first scan of an object (e.g., a patient) may be performed before the contrast agent is injected, and several subsequent scans of the object may be performed at various times (e.g., at regular intervals) after injection of the contrast agent, as the concentration of contrast agent changes. The rate at which the concentration of contrast agent increases initially, the peak concentration reached, and the rate at which the concentration of contrast agent subsequently decreases all may depend on the type of tissue into which the contrast is injected or which is of interest.

In some embodiments, various methods may be employed to generate images from medical imaging scan data to aid in the use of a medical imaging scan as a diagnostic tool. A sequence of steps, or "acts" illustrated in FIG. 2 and discussed in further detail below may be used, for example, to isolate an organ of interest (e.g., an organ suspected of having a tumor) and to form a video or series of images in which the isolated organ of interest is more readily apparent than in the raw scan data.

The processing circuitry 115 can include hardware, software, firmware, or a combination thereof arranged to perform operations of the method 200. The hardware can include electric or electronic components, such as one or more transistors, resistors, capacitors, diodes, inductors, switches, power sources, memory devices, oscillators, multiplexers, logic gates (e.g., AND, OR, XOR, negate, buffer, or the like), amplifiers, analog to digital converters, digital to analog converters, processing units (e.g., central processing units (CPUs), field programmable gate arrays (FPGAs), application specific integrated circuits (ASICs), graphic processing units (GPUs), or the like), or the like.

The display 120 can include a monitor, television, projector, screen (e.g., touch screen or non-touch screen), or the like, configured to present image data to the operator in visual form. The display 120 can receive image data from the processing circuitry 115 and provide a view of the image data.

Figure 2:
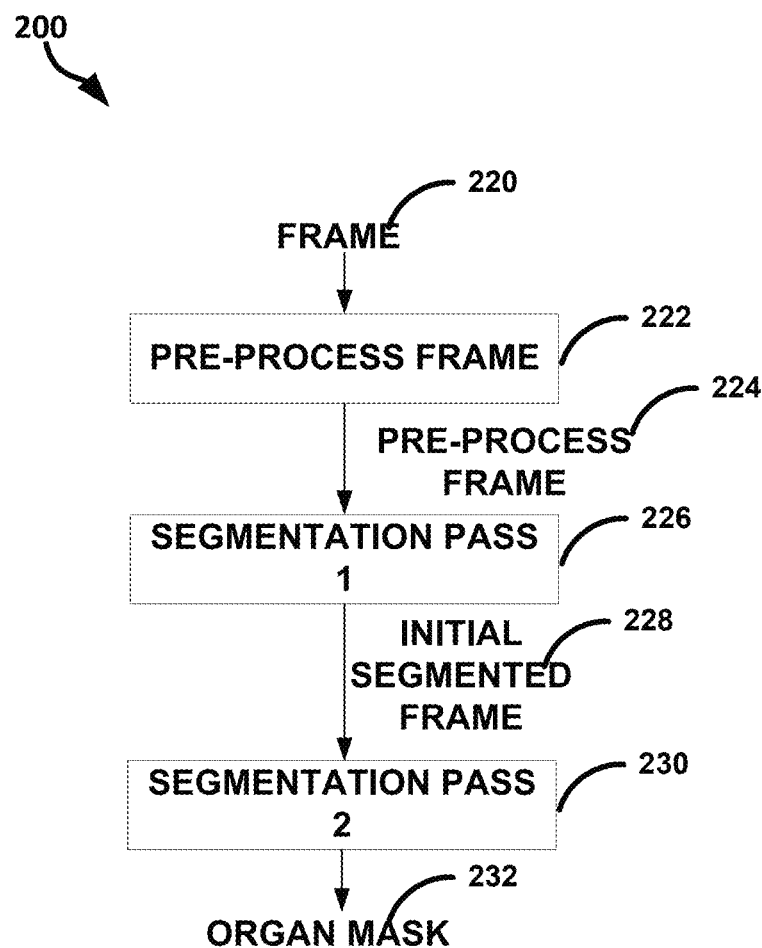
FIG. 2 illustrates, by way of example, a block diagram of an embodiment of a method for organ segmentation.

FIG. 2 illustrates, by way of example, a block diagram of an embodiment of a method 200 for organ segmentation. The method 200 as illustrated includes pre-processing a frame 220 at operation 222 resulting in a pre-processed frame 224, performing a first segmentation pass on the processed frame 224 at operation 226 resulting in an initial segmented frame 228, and performing a second segmentation pass on the initial segmented frame 228 at operation 230 resulting in an organ mask 232.

The method 200 can be performed for each frame of consecutive slices of a given entity. In some embodiments, the operations 222 and 226 can be performed on each frame and then the operation 230 can be performed on the initially segmented frames.

Figure 3:
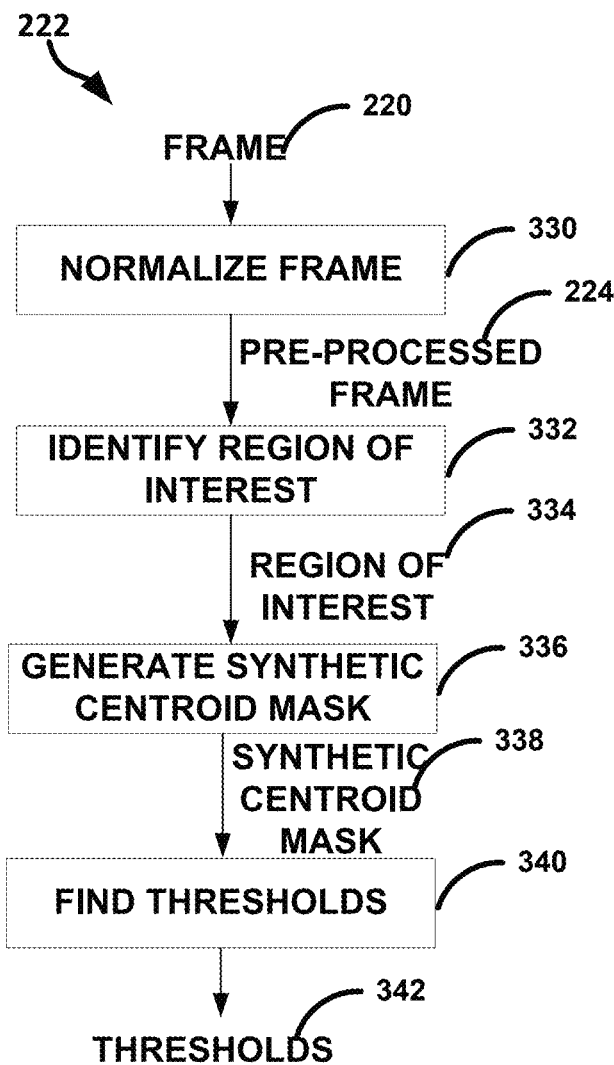
FIG. 3 illustrates, by way of example a diagram of aspects of frame pre-processing.

Aspects of the pre-process operation 222 are described regarding FIG. 3. Aspects of the first segmentation operation 226 are described regarding FIG. 7. Aspects of the second segmentation operation 230 are described regarding FIG. 8.

A result of the method 200 is an organ mask 232. The organ mask 232 can be a 3D mask of the organ through the frames 220. The 3D mask can be a composite of 2D masks that are provided from performing the method 200. Examples of the mask 232 are provided in FIG. 11.

FIG. 3 illustrates, by way of example a diagram of aspects of the operation 222. The operation 222 can include receiving a frame 220. At operation 330, the frame 220 can be normalized. The operation 330 results in a pre-processed frame 224. The operation 330 is described in more detail regarding FIG. 4.

The pre-processed frame 224 is provided to operation 332 that identifies a region of interest 334. The region of interest 334 can include the organ of interest. The region of interest 334 for a pancreas can be near a spinal column of a patient. The region of interest 334 can be guaranteed to include the organ of interest (e.g., the pancreas). The region of interest 334 can include the a region near a central area of an inside of a body.

A synthetic centroid mask 338 can be generated at operation 336. The operation 336 is described in more detail regarding FIG. 5. Thresholds 342 to be used in the first and second segmentation operations 226, 230 can be determined at operation 340. The operation 340 is described in more detail regarding FIG. 6.

Figure 4:
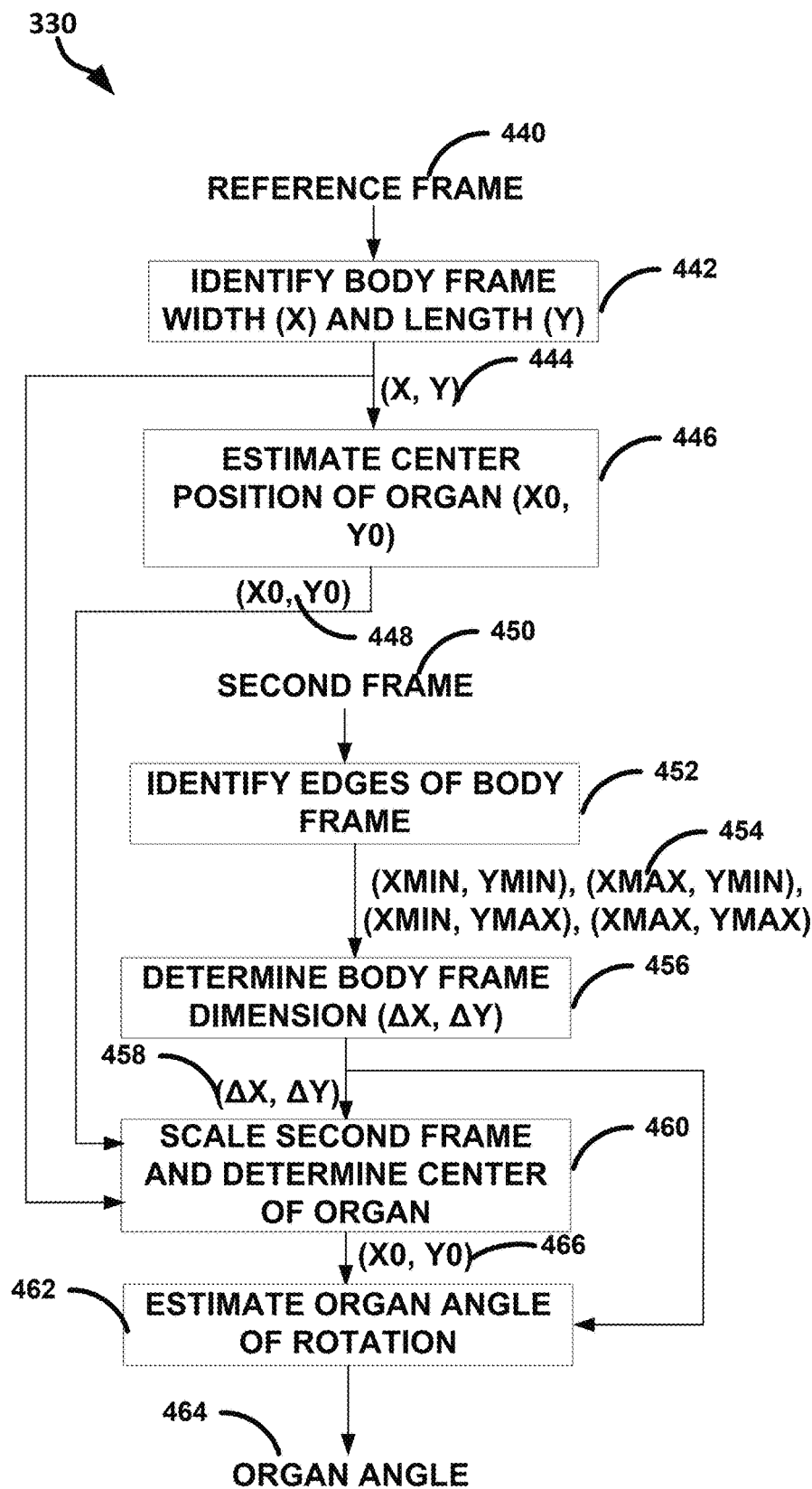
FIG. 4 illustrates, by way of example, a block diagram of an embodiment of a method for normalizing a frame.

FIG. 4 illustrates, by way of example, a block diagram of an embodiment of a method for performing the operation 330 of FIG. 3. The operation 330 as illustrated includes identifying a reference frame 440. The reference frame 440 is a frame of an array of frames. The reference frame 440 can be a random frame of the array of frames or a frame selected according to a criteria. The reference frame 440 can include a frame that an image analyzer can visually examine and use to manually approximate a center reference point of the organ of interest.

At operation 442, body frame dimensions, including a body frame width and a body frame length, can be determined. The body frame width and length are denoted as (X, Y) 444. The body frame dimensions can be determined based on resolution information in a header of the reference frame 440. The body frame is the spatial locations in the reference frame 440 to which the view of the internal portion of the body extend.

At operation 446, a center position 448 of an organ can be predicted. The center position 448 of the organ is denoted as (X0, Y0). The center position 448 and the body frame dimension 444 can be used to scale a frame of the array of frames at operation 460.

A different frame 450 can be received or retrieved. At operation 452 edges of the body frame 454 in the second frame 450 can be identified. This information can be determined based on header information of the frame 450. The edges of the body frame 454 can be defined by four points that define a rectangle in the frame 450. The body frame 454 can be guaranteed to include the organ of interest.

The edges of the body frame 454 can be used to determine the body frame dimension 458 at operation 456. The body frame dimension 458 can be determined based on [XMIN, XMAX, YMIN, YMAX].

At operation 460, the body frame dimension 458 and the body frame dimension 444 of the reference frame 440 can be used to scale the second frame 450. The second frame 450 can be scaled to match the scale of the reference frame 440. At operation 460, a center of the organ can be determined. The center of the organ can be estimated as a center of a head of the organ. The center of the organ can be estimated similar to the operation 446 but with the additional information indicating center position of the organ in the reference frame 440.

Based on the location of the center of the organ determined at operation 460 and the body frame dimension 458, determined at operation 456, an angle 464 that indicates the angle of rotation of the organ can be determined at operation 462. The organ angle 464 can be determined as a function of a body width and length ratio (in an axial view).

Figure 5:
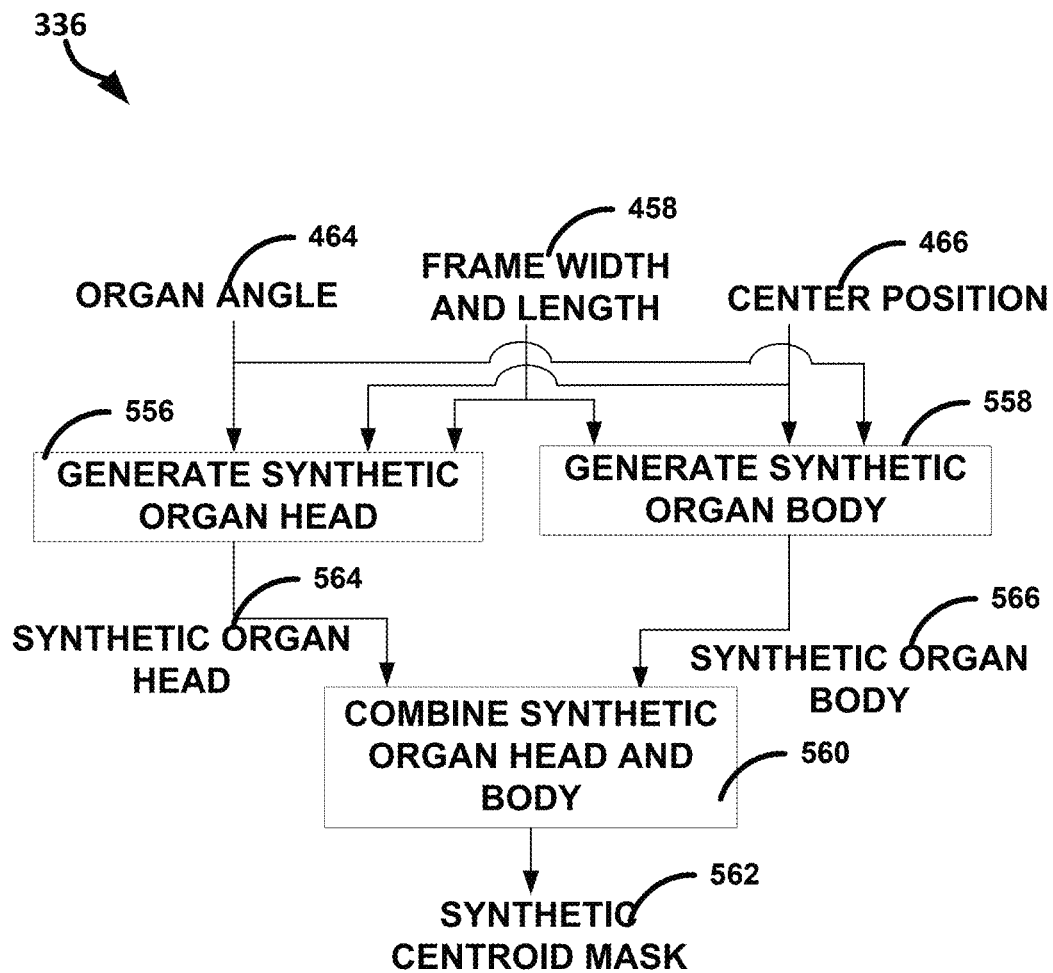
FIG. 5 illustrates, by way of example, a diagram of an embodiment of a method of generating a synthetic centroid mask.

FIG. 5 illustrates, by way of example, a diagram of an embodiment of a method of performing the operation 336. A result of the operation 336 can include a synthetic centroid mask 562. The synthetic centroid mask 562 provides an outline that can be used to identify pixels in the frame 450 that are associated with the organ.

The operation 336 can include generating a synthetic organ head 564 at operation 556 and generating a synthetic organ body 566 at operation 558. The synthetic organ head 564 can be generated separate from the synthetic organ body 566 because the organ is often displayed in two chunks in a given frame. This also allows for separate bending or rotation of different parts of the organ. The head 564 can bend or rotate differently than the body 566.

The operation 556 can be performed based on the organ angle 464, frame dimensions 458, and the center position 466 determined at operations 462, 456, and 460, respectively. This allows the organ mask to be oriented, sized, and shaped as a function of the MRI scan parameters.

Similarly, the operation 558 can be performed based on the organ angle 464, frame dimensions 458, and the center position 466 determined at operations 462, 456, and 460, respectively. This allows the organ mask to be oriented, sized, and shaped as a function of the MRI scan parameters. A synthetic centroid mask 562 can be generated by combining the organ head 564 and body 566 at operation 560. The synthetic centroid mask 562 can then be used to help identify pixels associated with the organ during segmentation.

Figure 6:
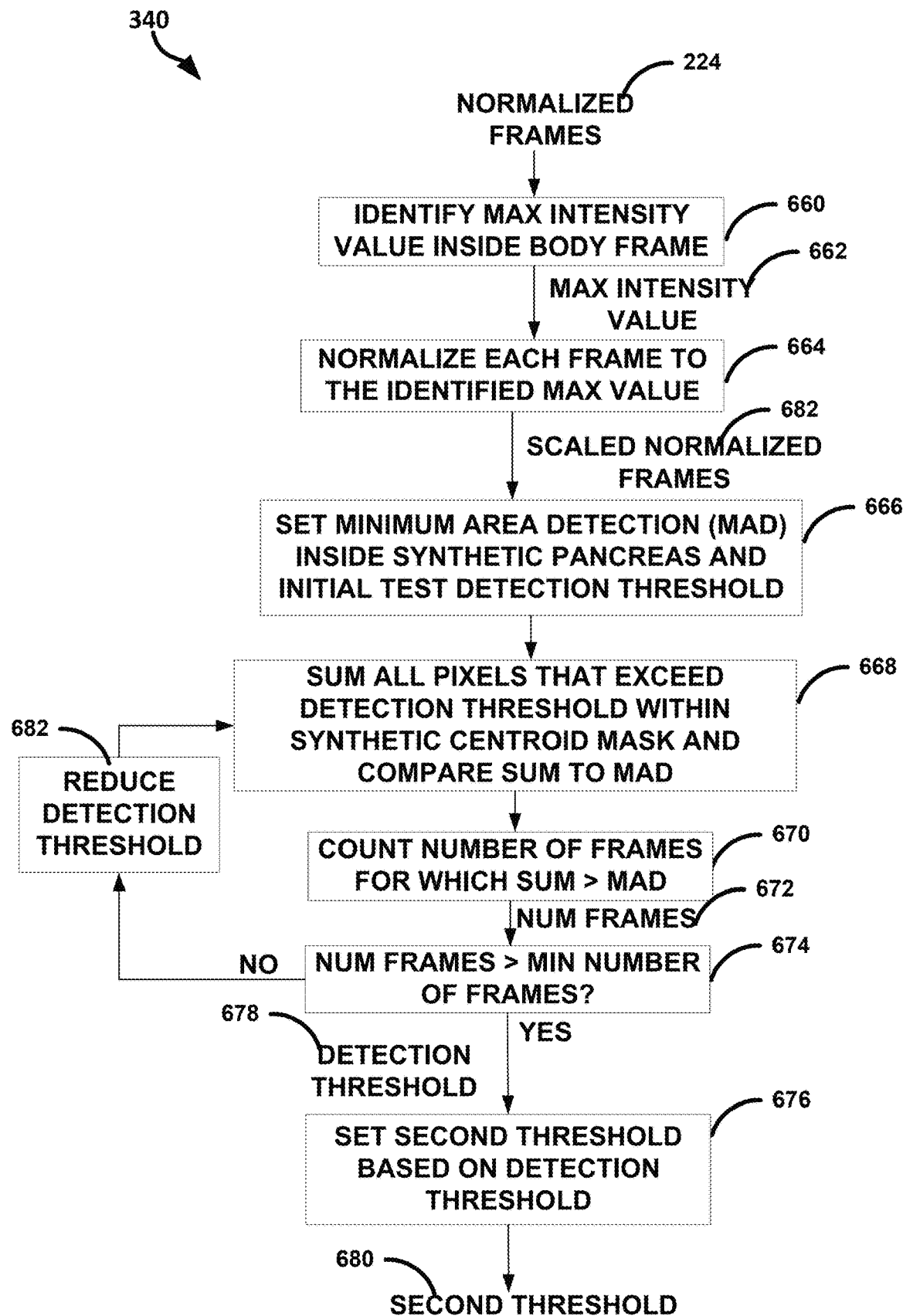
FIG. 6 illustrates, by way of example, a diagram of an embodiment of a method for finding segmentation mask thresholds.

FIG. 6 illustrates, by way of example, a diagram of an embodiment of a method for performing the operation 340. The operation 340 can identify a first pixel intensity threshold 678 and a second pixel intensity threshold 680. The operation 340 can include receiving or retrieving pre-processed frames 224. Then, the operation 340 can proceed to determine the thresholds 678, 680 for each of the frames 224.

At operation 660, a maximum intensity value 662 inside a body frame can be identified. The maximum intensity value 662 is the highest value. Multiple maximum intensity values can be present in a given frame or in multiple different frames. The maximum intensity value 662 can be determined across all normalized frames 224. At operation 664, pixel intensity values of a given frame can be normalized (e.g., scaled) based on the maximum intensity value. Normalizing all frames to the maximum intensity value 662 allows the detection threshold 678 and the second threshold 680 to be viable for all of the normalized frames 224. A different maximum intensity value can be determined for each patient scan array.

At operation 666, a minimum area detection (MAD) inside the synthetic centroid mask 562 can be determined. At operation 666, an initial test detection threshold can be set. For better performance of the techniques herein, the test detection threshold is set too high and iteratively reduced until the MAD is satisfied.

At operation 668, the synthetic centroid mask 562 can be positioned over the frame 682 such that it covers the center position 466. The number of pixels within the mask 562 greater than the detection threshold can be summed and compared to the MAD at operation 670. This can be repeated for each of the scaled normalized frames 682. A number 672 of scaled normalized frames 682 that include a number of pixel intensities that are greater than the MAD can be determined at operation 670.

The number 672 of scaled normalized frames 682 can be compared to a minimum number of frames at operation 674. The minimum number of frames can be determined empirically. The minimum number of frames can help ensure that the organ segmentation operates accurately. Without a sufficient number of frames, the mask generated can be inaccurate, disconnected, or a combination thereof.

If the number 672 of scaled normalized frames 682 that include a number of pixel intensity values, within the centroid mask greater than the detection threshold, that is not greater than the MAD, the detection threshold can be reduced at operation 682. If the number 672 of scaled normalized frames 682 that include a number of pixel intensity values, within the centroid mask greater than the detection threshold, that is greater than the MAD, a detection threshold 678 can be set for the frames 682. A second threshold 680 can be set at operation 676. The second threshold 680 can be set to be a scalar value of the detection threshold 678. The second threshold 680 will be used in the second segmentation pass, while the detection threshold 678 will be used in the first segmentation pass. Both the first and second segmentation passes will be discussed with regard to FIGS. 7 and 8.

The frame 450 can be received and bound at operation 770. Bounding the frame 450 can include keeping pixel intensity values in a region of interest set to their current value and setting all other pixel intensity values of the frame 450 to a specified value (e.g., zero (0)). The operation 770 can reduce the search space of the frame to reduce overall processing. The operation 770 can retain a central portion of the body in the frame around the spinal column. This is where organs of interest typically reside.

At operation 772, the bounded frame 794 can be normalized resulting in a bounded normalized frame 796. The operation 772 can include moving the region of interest in the frame 794 by column or pixel rows to better center the region of interest. At operation 774, pixels of the bounded normalized frame can be compared to the detection threshold 678. Any pixels with intensity values less than the detection threshold can be removed (e.g., intensity value set to 0) from the bounded normalized frame 796. The result of the operation 774 is a partially segmented frame 798. It is partially segmented because the frame likely includes the pixels corresponding to the organ of interest as well as other structures in view in the frame 798.

At operation 776, small objects can be removed resulting in a partially segmented frame with small objects removed 702. Removing small objects at operation 776 can include counting a number of contiguous pixels with intensity greater than a specified value (e.g., zero (0)). If the number of contiguous pixels is below a specified pixel count threshold (e.g., 5, 10, 15, 20, a greater or lesser number, or some number therebetween), those pixels can be removed (e.g., intensity values of those pixels can be set to zero (0)).

At operation 778, objects that include a sufficient number of contiguous pixels (were not removed at operation 776) can have their mean intensity checked. The mean intensity check can include determining an average of the pixel intensities of the pixels that make up the object. If the average of the pixel intensities is higher than the average pixel intensity of the pixels of the organ of interest, than those pixels can be removed. In some embodiments, the average needs to be more than a threshold more than the average pixel intensity of the pixels of the organ of interest. A further segmented frame 702 is a result of the operation 778.

The centroid mask 562 can be used at operation 780 to identify objects in the further segmented frame 702 that are likely part of the organ of interest. The operation 780 can include identifying and retaining objects with a centroid (center pixel) that is within the synthetic centroid mask 562. Any objects with centroids outside of the centroid mask 562 can be removed at operation 782. The retained objects can be marked as "do not remove", such as by setting a bit associated with the object.

Operation 782 can include testing objects outside all four sides of the centroid mask 562. A temporary mask can be generated for each side of the centroid mask 562. If the object is not indicated as retained and includes a pixel in one of the temporary masks, the object can be removed. A result of the operation is the initially segmented frame 228.

An organ mask can be defined to include the perimeter pixels of the retained objects of the initial segmented frame 338. The organ mask can be expanded at operation 786. The operation 786 can include extending the organ mask in all directions by a specified number of pixels (e.g., 1, 2, 3, or other number of pixels). Any holes in the organ mask can be filled in at operation 788 resulting in an initial organ mask 790 for the frame 228.

At operation 792, a center slice can be identified. The center slice is the slice in an array of frames that is in the middle of frames in which the organ of interest is visible. The operation 792 can include identifying each of the frames that include a non-zero initial organ mask 790 and determining the frame that is in the middle of the identified frames.

Figure 7:
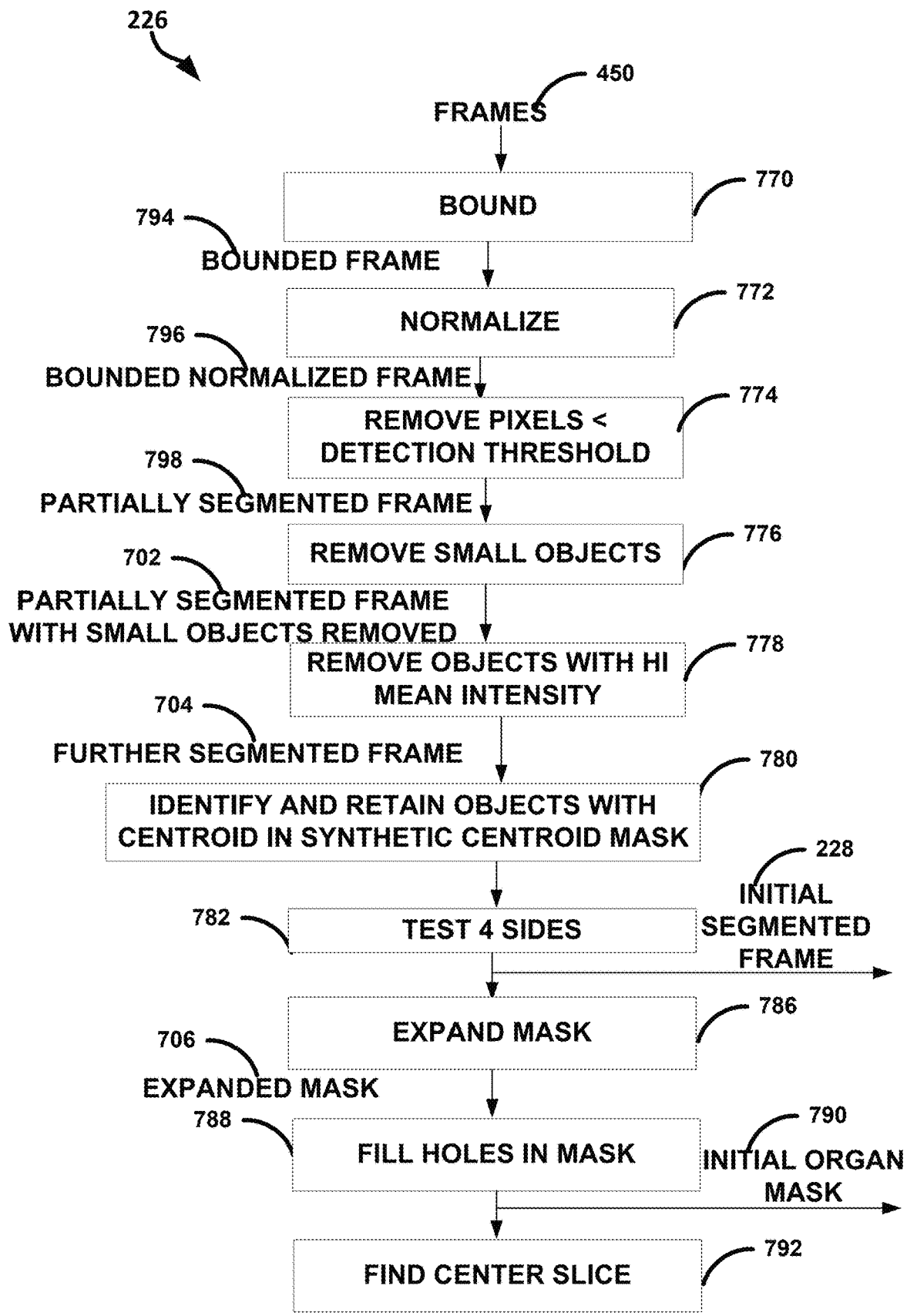
FIG. 7 illustrates, by way of example, a block diagram of a method for performing the first segmentation pass operation of FIG. 2.
Figure 8:
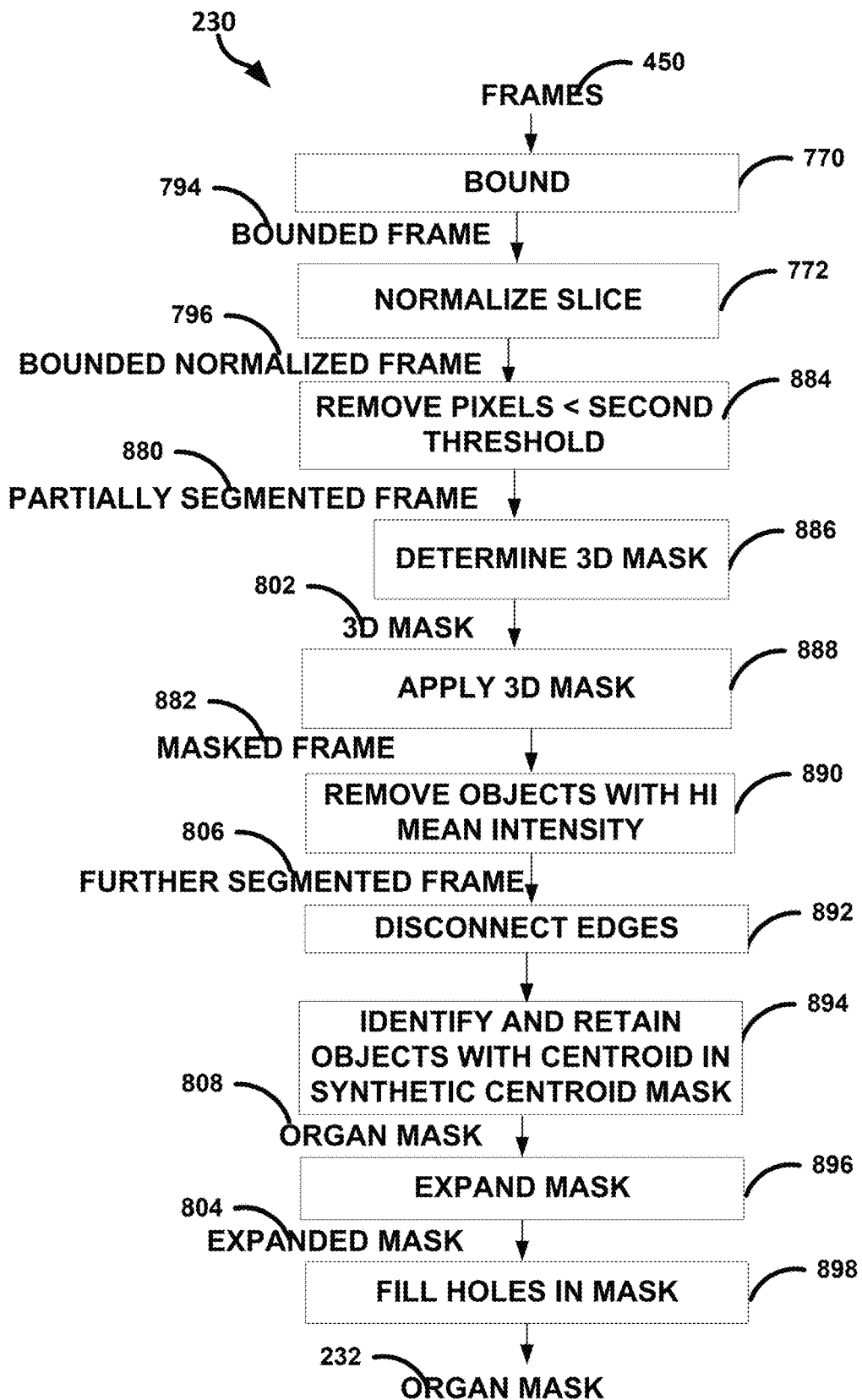
FIG. 8 illustrates, by way of example, a block diagram of a method for performing the second segmentation pass operation of FIG. 2.

FIG. 8 illustrates, by way of example, a block diagram of a method for performing the operation 230. The operation 230 can begin similar to the operation 226. The operations 770 and 772 are the same as those of FIG. 7 but performed.

At operation 884, pixels of the bounded normalized frame with intensities less than the second threshold 680 are removed resulting in a partially segmented frame 880. A 3D mask 802 (a collection of 2D organ masks 790 through the frames 450) can be determined at operation 886 and applied to the partially segmented frame 880 at operation 888. Applying the 3D mask 802 can include retaining only pixels of objects in the partially segmented frame 880 that include a centroid within the 3D mask 802 and removing the rest of the objects.

At operation 890, objects with a high mean intensity can be removed (similar to the operation 778). In the operation 230, the operation 890 can help remove tumors, veins, or other parts that can be within the organ mask 802 but not part of the organ.

At operation 892, any objects with a tenuous connection can be disconnected. For each row of pixels, if the number of pixels with intensity values greater than a specified threshold (e.g., zero) is less than a specified count (e.g., 1, 2, 3, or a greater value), those pixels can be set to zero to disconnect the objects. The operation 892 helps remove objects in contact with the organ of interest.

At operation 894, objects with centroid within the synthetic centroid mask 562 can be identified. The operation 894 can include retaining the identified objects and removing any objects that include a centroid outside the centroid mask 562 (as a result of disconnecting edges at operation 892).

The organ mask 802 can be expanded at operation 896. The operation 896 is similar to the operation 786. At operation 898, holes in the expanded organ mask 804 can be filled in to generate the organ mask 232 for the frame 450. A 3D mask can include a series of 2D organ masks for a given patient. The 3D mask can be displayed over a series of slices to aid personnel in analyzing the organ of interest.

Figure 9:
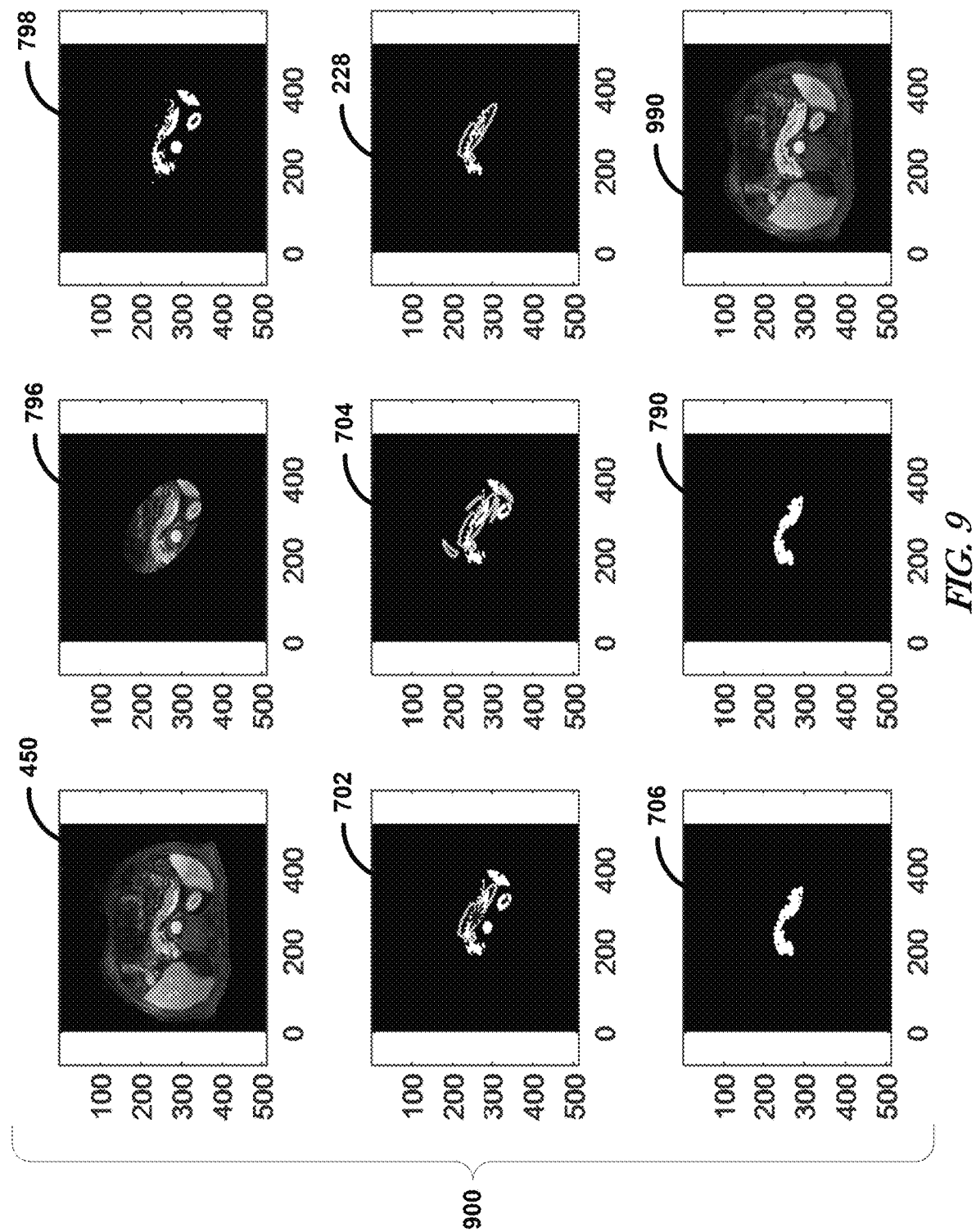
FIG. 9 illustrates a series of images of an example frame before and after some of the operations of FIG. 7.

FIG. 9 illustrates a series of images 900 of an example frame 450 before and after some of the operations of FIG. 7. The frame 796 illustrates a result of performing the operations 770 and 772 on the frame 450. The frame 798 includes an initial organ mask generated after the operation 774. Each pixel in the initial organ mask that is greater than the detection threshold 678 can be set to 1 and the remainder can be set to zero.

The partially segmented frame with small objects removed 702 is a result of performing the operation 776 on the partially segmented frame 798. The further segmented frame 704 is a result of performing the operation 778 on the partially segmented frame with small objects removed 702. The initial segmented frame 228 is produced as a result of the operation 782. The initial segmented frame 228 can be used as a basis to generate an organ mask. The organ mask can include the pixels of the initial segmented frame 228 that include an intensity greater than 0.

The expanded organ mask 706 is a result of the operation 786. The initial organ mask 790 is a result of the operation 788. An image 990 shows a perimeter of the organ mask 790 displayed over the frame 450.

Figure 10:
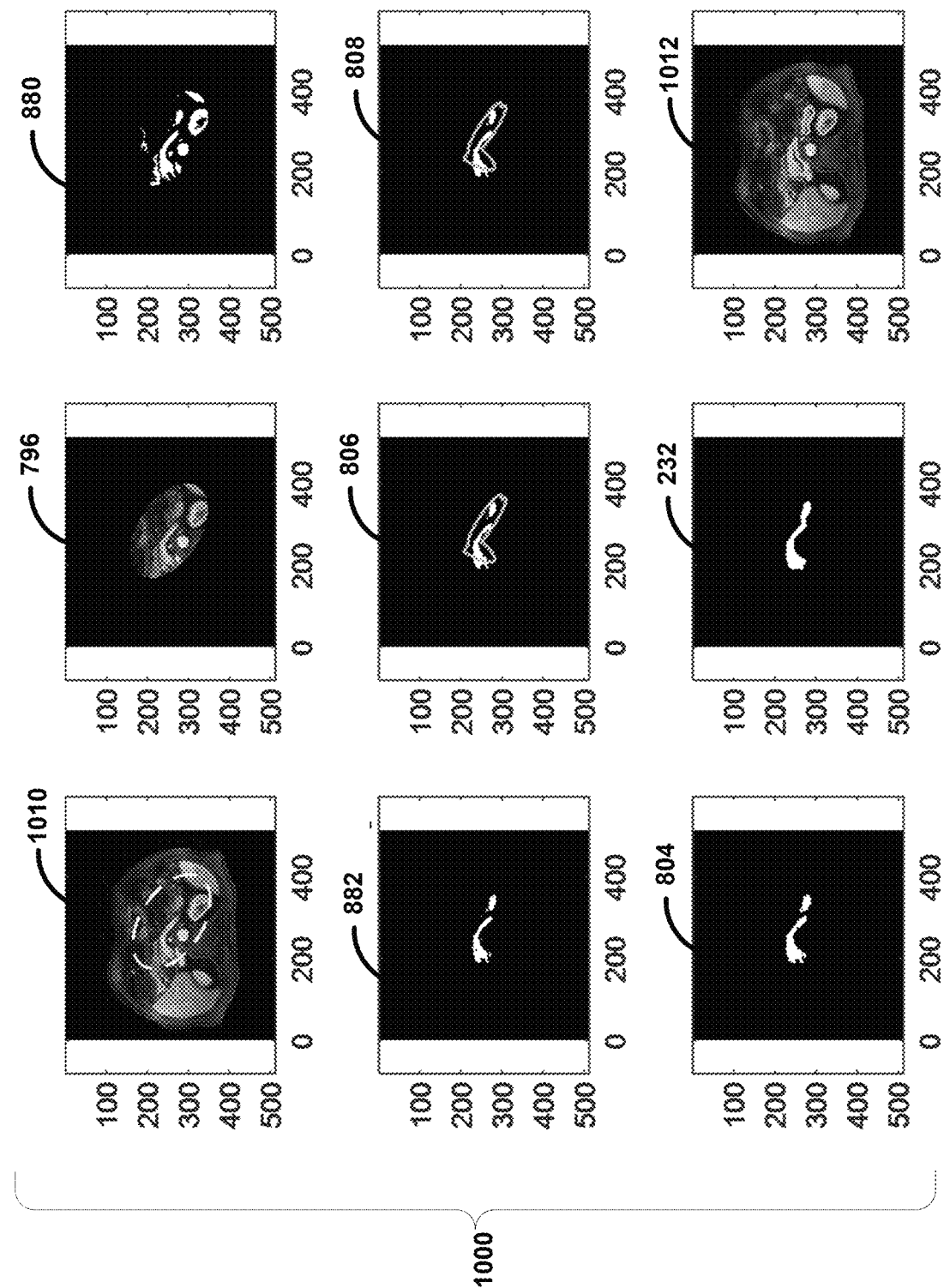
FIG. 10 illustrates a series of images of an example frame before and after some of the operations of FIG. 8.

FIG. 10 illustrates a series of images 1000 of an example frame 1010 before and after some of the operations of FIG. 8. The frame 1010 includes an identified region of interest in dashed lines. The frame 796 illustrates a result of performing the operations 770 and 772 on the frame 1010. The frame 880 includes an initial organ mask generated after the operation 884. Each pixel in the frame 880 that is greater than the second detection threshold 680 can be set to 1 and the remainder can be set to zero.

The organ mask 882 can be generated as a result of the operation 888. The operation 886 can be performed based on the organ mask 790 for each scan in the array. The frame 806 can be generated as a result of the operation 890. The operations 892 and 894 can be applied to the frame 806 to generate the organ mask 808. The organ mask 808 can be expanded at operation 896 to generate the expanded organ mask 804. The expanded organ mask 804 can have holes filled in (disconnected objects connected) at operation 898 to generate the organ mask 232. The image 1012 includes the frame 1010 with the perimeter of the organ mask 232 illustrated thereover.

Figure 11:
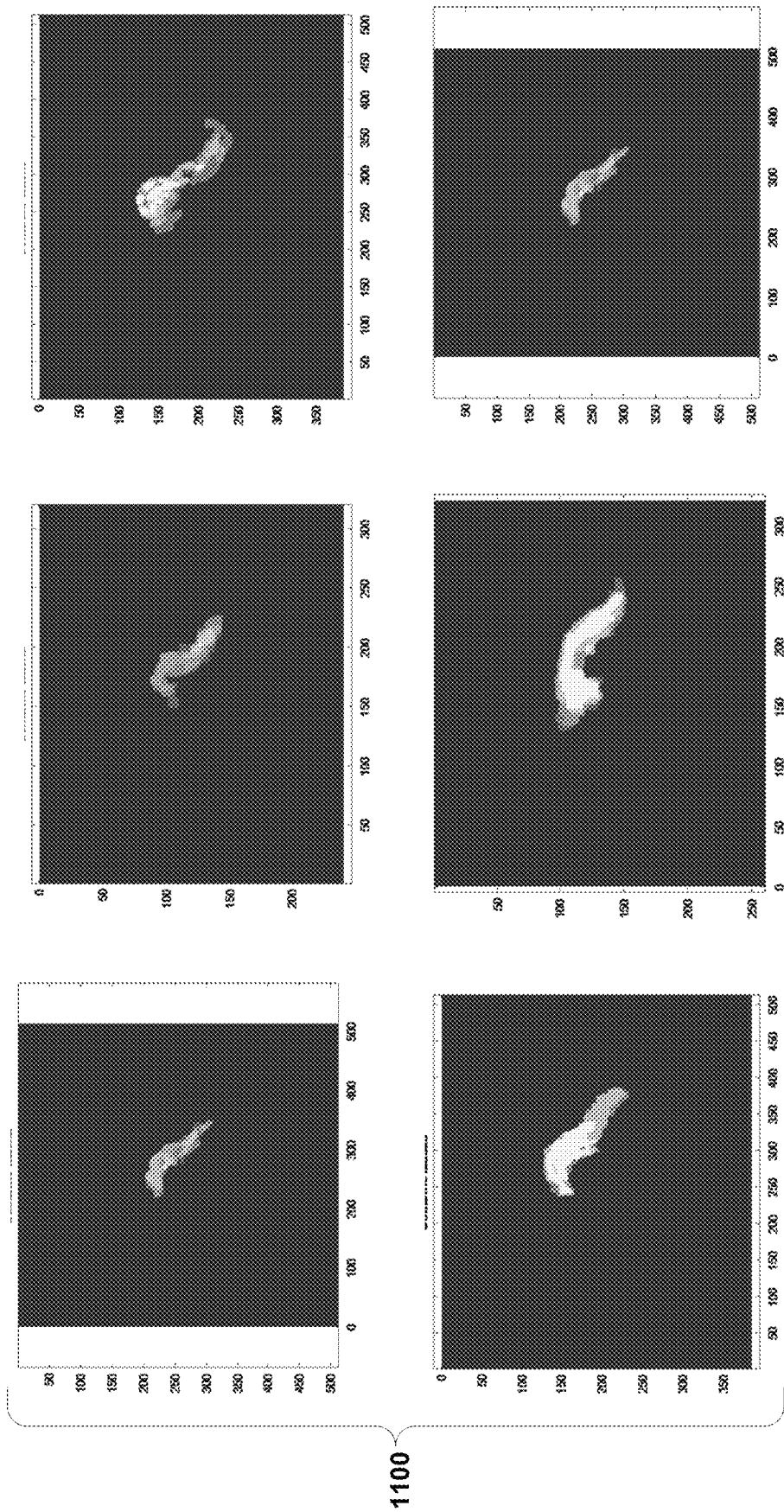
FIG. 11 illustrates, by way of example, a variety of images of a 3D mask.

FIG. 11 illustrates, by way of example, a variety of images 1100 of the 3D organ mask. The 3D organ mask includes a combination of the 2D organ masks generated for each frame 450. The different shading in the 3D organ mask indicates a different frame 450 from which the 2D organ mask was generated.

Figure 12:
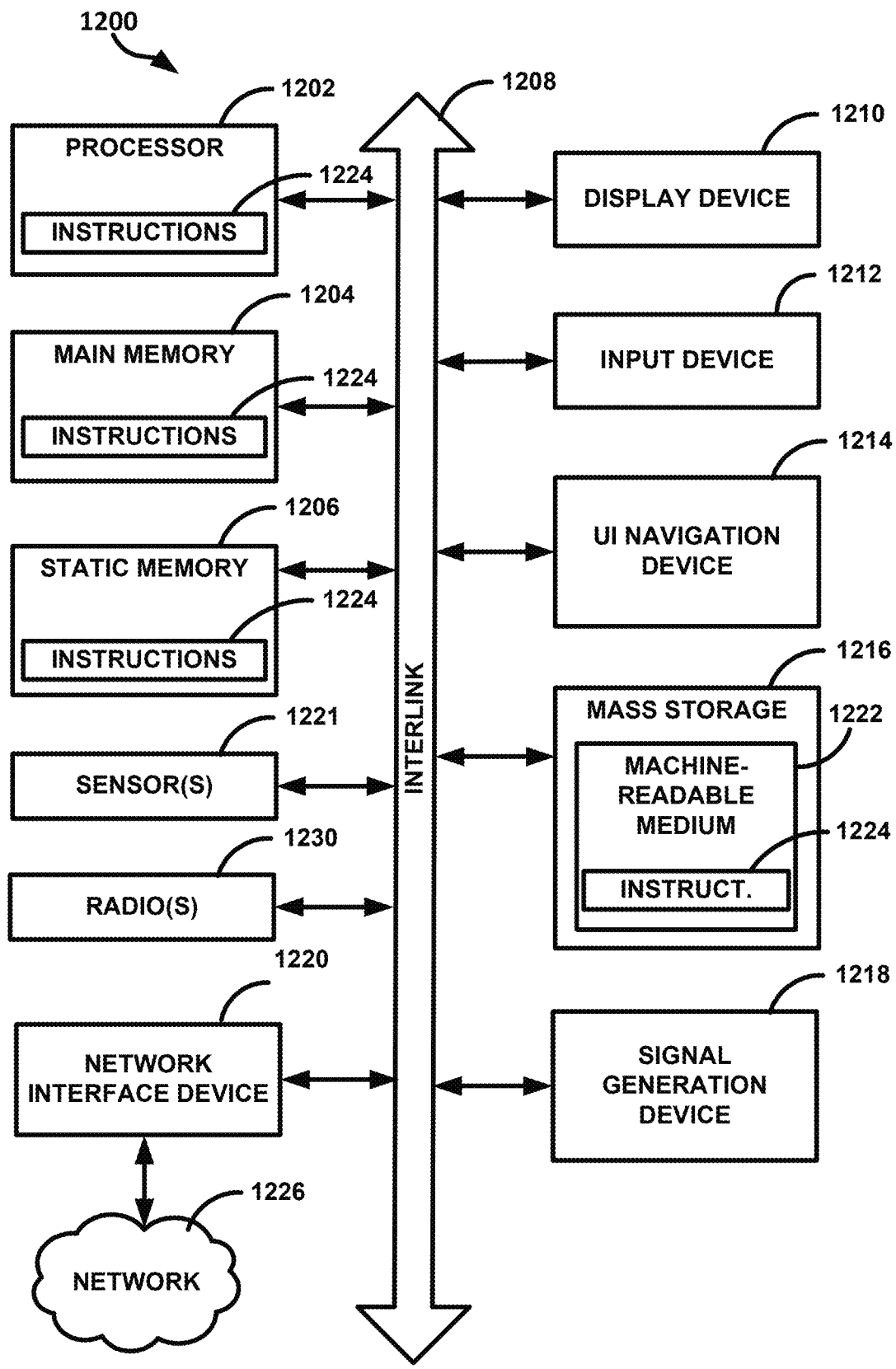
FIG. 12 illustrates, by way of example, a block diagram of an embodiment of a machine in the example form of a computer system within which instructions, for causing the machine to perform any one or more of the methodologies discussed herein, may be executed.

FIG. 12 illustrates, by way of example, a block diagram of an embodiment of a machine in the example form of a computer system within which instructions, for causing the machine to perform any one or more of the methodologies discussed herein, may be executed. The scanner 110, processing circuitry 115, display 120, input devices 125, or other component can include or be implemented using one or more components of the machine 1200. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a mass storage unit 1216, a signal generation device 1218 (e.g., a speaker), a network interface device 1220, and a radio 1230 such as Bluetooth, WWAN, WLAN, and NFC, permitting the application of security controls on such protocols.

The computer system 1200 as illustrated includes a sensor 1221 that converts energy from one form into energy in another form. The sensor 221 is a transducer that can convert thermal energy, sound energy, optical energy, mechanical energy, or other energy into an electrical signal. The sensor 1221 in general can provide data indicative of a characteristic of the environment in which the sensor 1221 is situated.

The mass storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 can include a computer-implemented method for organ segmentation, the method comprising generating a synthetic centroid mask, identifying first and second intensity thresholds, in a first segmentation pass, setting (i) pixels of an image with intensities less than the first threshold to zero and (ii) pixels of the image corresponding to objects with centroids outside the synthetic centroid mask to zero, resulting an initial organ mask, in a second segmentation pass, setting pixels (i) with intensities less than the second threshold, the second threshold less than the first threshold to zero and (ii) setting pixels corresponding to objects with centroids outside the initial organ mask to zero, resulting in a second organ mask, and expanding and filling the second organ mask to generate an organ mask.

In Example 2, Example 1 can further include generating the organ mask for each frame of an array of scans and combining the generated organ masks to generate a three-dimensional organ mask.

In Example 3, at least one of Examples 1-2 can further include, wherein the first segmentation pass further includes removing objects in the frame that include mean pixel intensity greater than a mean pixel intensity of objects with centroids in the synthetic centroid mask.

In Example 4, at least one of Examples 1-3 can further include, wherein the first segmentation pass further includes removing objects that lie outside the centroid mask.

In Example 5, at least one of Examples 1-4 can further include, wherein the second segmentation pass further includes disconnecting objects that are connected by, at most, a specified number of pixels resulting in disconnected objects.

In Example 6, Example 5 can further include, wherein the second segmentation pass further includes removing an object of the disconnected objects with a centroid outside of the synthetic centroid mask.

In Example 7, at least one of Examples 1-6 can further include, wherein the first and second segmentation pass further includes normalizing a size and position of the organ in the image.

Example 8 can include a non-transitory machine-readable medium including instructions that, when executed by a machine, cause the machine to perform operations for organ segmentation, the operations comprising generating a synthetic centroid mask, identifying first and second intensity thresholds, in a first segmentation pass, setting (i) pixels of an image with intensities less than the first threshold to zero and (ii) pixels of the image corresponding to objects with centroids outside the synthetic centroid mask to zero, resulting an initial organ mask, in a second segmentation pass, setting pixels (i) with intensities less than the second threshold, the second threshold less than the first threshold to zero and (ii) setting pixels corresponding to objects with centroids outside the initial organ mask to zero, resulting in a second organ mask, and expanding and filling the second organ mask to generate an organ mask.

In Example 9, Example 8 can further include, wherein the operations further comprise generating the organ mask for each frame of an array of scans and combining the generated organ masks to generate a three-dimensional organ mask.

In Example 10, at least one of Examples 8-9 can further include, wherein the first segmentation pass further includes removing objects in the frame that include mean pixel intensity greater than a mean pixel intensity of objects with centroids in the synthetic centroid mask.

In Example 11, at least one of Examples 8-10 can further include, wherein the first segmentation pass further includes removing objects that lie outside the centroid mask.

In Example 12, at least one of Examples 8-11 can further include, wherein the second segmentation pass and the operations further comprise disconnecting objects that are connected by, at most, a specified number of pixels resulting in disconnected objects.

In Example 13, Example 12 can further include, wherein the second segmentation pass further includes removing an object of the disconnected objects with a centroid outside of the synthetic centroid mask.

In Example 14, at least one of Examples 8-13 can further include, wherein the first and second segmentation pass further includes normalizing a size and position of the organ in the image.

Example 15 can include a system comprising processing circuitry, a memory device including instructions stored thereon that, when executed by the processing circuitry, cause the processing circuitry to perform operations for organ mask generation, the operations comprising generating a synthetic centroid mask, identifying first and second intensity thresholds, in a first segmentation pass, setting (i) pixels of an image with intensities less than the first threshold to zero and (ii) pixels of the image corresponding to objects with centroids outside the synthetic centroid mask to zero, resulting an initial organ mask, in a second segmentation pass, setting pixels (i) with intensities less than the second threshold, the second threshold less than the first threshold to zero and (ii) setting pixels corresponding to objects with centroids outside the initial organ mask to zero, resulting in a second organ mask, and expanding and filling the second organ mask to generate an organ mask.

In Example 16, Example 15 can further include, wherein the operations further comprise generating the organ mask for each frame of an array of scans and combining the generated organ masks to generate a three-dimensional organ mask.

In Example 17, at least one of Examples 15-16 can further include, wherein the first segmentation pass further includes removing objects in the frame that include mean pixel intensity greater than a mean pixel intensity of objects with centroids in the synthetic centroid mask.

In Example 18, at least one of Examples 15-17 can further include, wherein the first segmentation pass further includes removing objects that lie outside the centroid mask.

In Example 19, at least one of Examples 15-18 can further include, wherein the second segmentation pass and the operations further comprise disconnecting objects that are connected by, at most, a specified number of pixels resulting in disconnected objects.

In Example 20, Example 19 can further include, wherein the second segmentation pass further includes removing an object of the disconnected objects with a centroid outside of the synthetic centroid mask.

In Example 21, at least one of Examples 15-20 can further include, wherein the first and second segmentation pass further includes normalizing a size and position of the organ in the image.

The Appendix provides disclosure of other organ segmentation techniques that can be used, in whole or in part, with embodiments herein.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the aspects of this disclosure disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for organ segmentation, the method comprising:
generating a synthetic centroid mask with a synthetic centroid mask perimeter, the synthetic centroid mask based on an organ of interest;
identifying first and second intensity thresholds;
in a first segmentation pass, setting (i) pixels of an image with intensities less than the first threshold to zero and (ii) pixels of the image corresponding to objects with centroids outside the synthetic centroid mask perimeter to zero, resulting in an initial organ mask with an initial organ mask perimeter, the first segmentation pass includes removing objects in a frame that include a mean pixel intensity greater than a mean pixel intensity of objects with centroids in the synthetic centroid mask;
in a second segmentation pass, setting pixels (i) with intensities less than the second threshold, the second threshold less than the first threshold, to zero and (ii) setting pixels corresponding to objects with centroids outside the initial organ mask perimeter to zero, resulting in a second organ mask; and
expanding and filling the second organ mask to generate an organ mask.

2. The method of claim 1, further comprising generating the organ mask for each frame of an array of scans and combining the generated organ masks to generate a three-dimensional organ mask.

3. The method of claim 1, wherein the first segmentation pass further includes removing objects that lie outside the centroid mask.

4. The method of claim 1, wherein the second segmentation pass further includes disconnecting objects that are connected by, at most, a specified number of pixels resulting in disconnected objects.

5. The method of claim 4, wherein the second segmentation pass further includes removing an object of the disconnected objects with a centroid outside of the synthetic centroid mask.

6. The method of claim 1, wherein the first and second segmentation pass further includes normalizing a size and position of the organ in the image.

7. A non-transitory machine-readable medium including instructions that, when executed by a machine, cause the machine to perform operations for organ segmentation, the operations comprising:
generating a synthetic centroid mask with a synthetic centroid mask perimeter, the synthetic centroid mask based on an organ of interest;
identifying first and second intensity thresholds;
in a first segmentation pass, setting (i) pixels of an image with intensities less than the first threshold to zero and (ii) pixels of the image corresponding to objects with centroids outside the synthetic centroid mask perimeter to zero, resulting in an initial organ mask with an initial organ mask perimeter, the first segmentation pass includes removing objects in a frame that include a mean pixel intensity greater than a mean pixel intensity of objects with centroids in the synthetic centroid mask;
in a second segmentation pass, setting pixels (i) with intensities less than the second threshold, the second threshold less than the first threshold, to zero and (ii) setting pixels corresponding to objects with centroids outside the initial organ mask perimeter to zero, resulting in a second organ mask; and
expanding and filling the second organ mask to generate an organ mask.

8. The non-transitory machine-readable medium of claim 7, wherein the operations further comprise generating the organ mask for each frame of an array of scans and combining the generated organ masks to generate a three-dimensional organ mask.

9. The non-transitory machine-readable medium of claim 7, wherein the first segmentation pass further includes removing objects that lie outside the centroid mask.

10. The non-transitory machine-readable medium of claim 7, wherein the second segmentation pass and the operations further comprise disconnecting objects that are connected by, at most, a specified number of pixels resulting in disconnected objects.

11. The non-transitory machine-readable medium of claim 10, wherein the second segmentation pass further includes removing an object of the disconnected objects with a centroid outside of the synthetic centroid mask.

12. The non-transitory machine-readable medium of claim 7, wherein the first and second segmentation pass further includes normalizing a size and position of the organ in the image.

13. A system comprising:
processing circuitry;
a memory device including instructions stored thereon that, when executed by a machine, cause the machine to perform operations for organ mask generation, the operations comprising:
generating a synthetic centroid mask with a synthetic centroid mask perimeter, the synthetic centroid mask based on an organ of interest;
identifying first and second intensity thresholds;
in a first segmentation pass, setting (i) pixels of an image with intensities less than the first threshold to zero and (ii) pixels of the image corresponding to objects with centroids outside the synthetic centroid mask perimeter to zero, resulting in an initial organ mask with an initial organ mask perimeter, the first segmentation pass includes removing objects in a frame that include a mean pixel intensity greater than a mean pixel intensity of objects with centroids in the synthetic centroid mask;
in a second segmentation pass, setting pixels (i) with intensities less than the second threshold, the second threshold less than the first threshold, to zero and (ii) corresponding to objects with centroids outside the initial organ mask perimeter to zero, resulting in a second organ mask; and
expanding and filling the second organ mask to generate an organ mask.

14. The system of claim 13, wherein the operations further comprise generating the organ mask for each frame of an array of scans and combining the generated organ masks to generate a three-dimensional organ mask.

15. The system of claim 13, wherein the first segmentation pass further includes removing objects that lie outside the centroid mask.

16. The system of claim 13, wherein the second segmentation pass and the operations further comprise disconnecting objects that are connected by, at most, a specified number of pixels resulting in disconnected objects.

17. The system of claim 16, wherein the second segmentation pass further includes removing an object of the disconnected objects with a centroid outside of the synthetic centroid mask.

18. The system of claim 13, wherein the first and second segmentation pass further includes normalizing a size and position of the organ in the image.

* * * * *

UNITED STATES PATENT AND TRADEMARK OFFICE
CERTIFICATE OF CORRECTION

| | | |
|---|---|---|
| PATENT NO. | : 12,417,543 B2 | Page 1 of 1 |
| APPLICATION NO. | : 17/833403 | |
| DATED | : September 16, 2025 | |
| INVENTOR(S) | : Tran et al. | |

It is certified that error appears in the above-identified patent and that said Letters Patent is hereby corrected as shown below:

On the Title Page

On page 2, in Column 2, under item (56) "Other Publications", Line 2, delete "DecisionFusion" and insert --Decision Fusion-- therefor In the Specification In Column 7, Line 46, delete "702" and insert --704-- therefor In Column 7, Line 49, delete "702" and insert --704-- therefor In Column 7, Line 65, delete "338." and insert --228.-- therefor In Column 10, Line 3, delete "221" and insert --1221-- therefor Signed and Sealed this
Tenth Day of February, 2026

John A. Squires
*Director of the United States Patent and Trademark Office*